(12) United States Patent
Dezonno

(10) Patent No.: US 7,831,033 B2
(45) Date of Patent: Nov. 9, 2010

(54) METHOD OF PREFERENCE DRIVEN SEGMENTATION ROUTING

(75) Inventor: Anthony Dezonno, Bloomingdale, IL (US)

(73) Assignee: Aspect Software, Inc., Lombard, IL (US)

( * ) Notice: Subject to any disclaimer, the term of this patent is extended or adjusted under 35 U.S.C. 154(b) by 1244 days.

(21) Appl. No.: 11/025,166

(22) Filed: Dec. 23, 2004

(65) Prior Publication Data

US 2006/0140390 A1 Jun. 29, 2006

(51) Int. Cl.
*H04M 3/00* (2006.01)
*H04M 5/00* (2006.01)

(52) U.S. Cl. ............................. 379/265.12; 379/265.01; 379/265.02; 379/265.05

(58) Field of Classification Search .................. 379/265, 379/265.12, 265.09, 265.06, 265.02, 265.01, 379/265.05, 266.01; 709/228, 225
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,857,018 A | 1/1999 | Sumner et al. | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,222,919 B1 * | 4/2001 | Hollatz et al. | 379/265.12 |
| 6,333,980 B1 * | 12/2001 | Hollatz et al. | 379/265.12 |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,424,709 B1 | 7/2002 | Doyle et al. | |
| 6,732,156 B2 | 5/2004 | Miloslavsky | |
| 6,778,660 B2 * | 8/2004 | Fromm | 379/265.02 |
| 6,798,876 B1 * | 9/2004 | Bala | 379/265.12 |
| 6,856,680 B2 * | 2/2005 | Mengshoel et al. | 379/265.06 |
| 7,072,966 B1 * | 7/2006 | Benjamin et al. | 709/228 |
| 2002/0146110 A1 * | 10/2002 | Fromm | 379/265.02 |
| 2004/0225733 A1 * | 11/2004 | Tesink et al. | 709/225 |
| 2008/0267388 A1 * | 10/2008 | Odinak et al. | 379/265.09 |

* cited by examiner

*Primary Examiner*—Thjuan K Addy
(74) *Attorney, Agent, or Firm*—Husch Blackwell LLP Welsh & Katz

(57) ABSTRACT

A method and apparatus are provided for assigning a plurality of agents to a plurality of contacts. The method includes the steps of providing an ordered list of agent preferences for each contact of the plurality of contacts, providing an ordered list of contact preferences for each agent of the plurality of agents and assigning an agent of the plurality of agents to a contact of the plurality of contacts based upon the preferences lists of both the contact and agent.

34 Claims, 2 Drawing Sheets

METHOD OF PREFERENCE DRIVEN SEGMENTATION ROUTING

FIELD OF THE INVENTION

The field of the invention relates to communication systems and more particularly, to automatic call distributors.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. In this regard, DNIS information may be used to identify an intended call target and to select an appropriate sales presentation for use by the agent based upon the intended call target.

While automatic call distributors work relatively well, they distribute calls based upon a set of relatively inflexible algorithms (e.g., longest available agent, skill of the agents, etc.). Because of the importance of telemarketing, a need exists for more flexible methods of distributing calls that takes into account a myriad of other factors.

SUMMARY

A method and apparatus are provided for assigning a plurality of agents to a plurality of contacts. The method includes the steps of providing an ordered list of agent preferences for each contact of the plurality of contacts, providing an ordered list of contact preferences for each agent of the plurality of agents and assigning an agent of the plurality of agents to a contact of the plurality of contacts based upon the preferences lists of both the contact and agent.

DETAILED DESCRIPTION OF AN ILLUSTRATED EMBODIMENT

Figure 1:
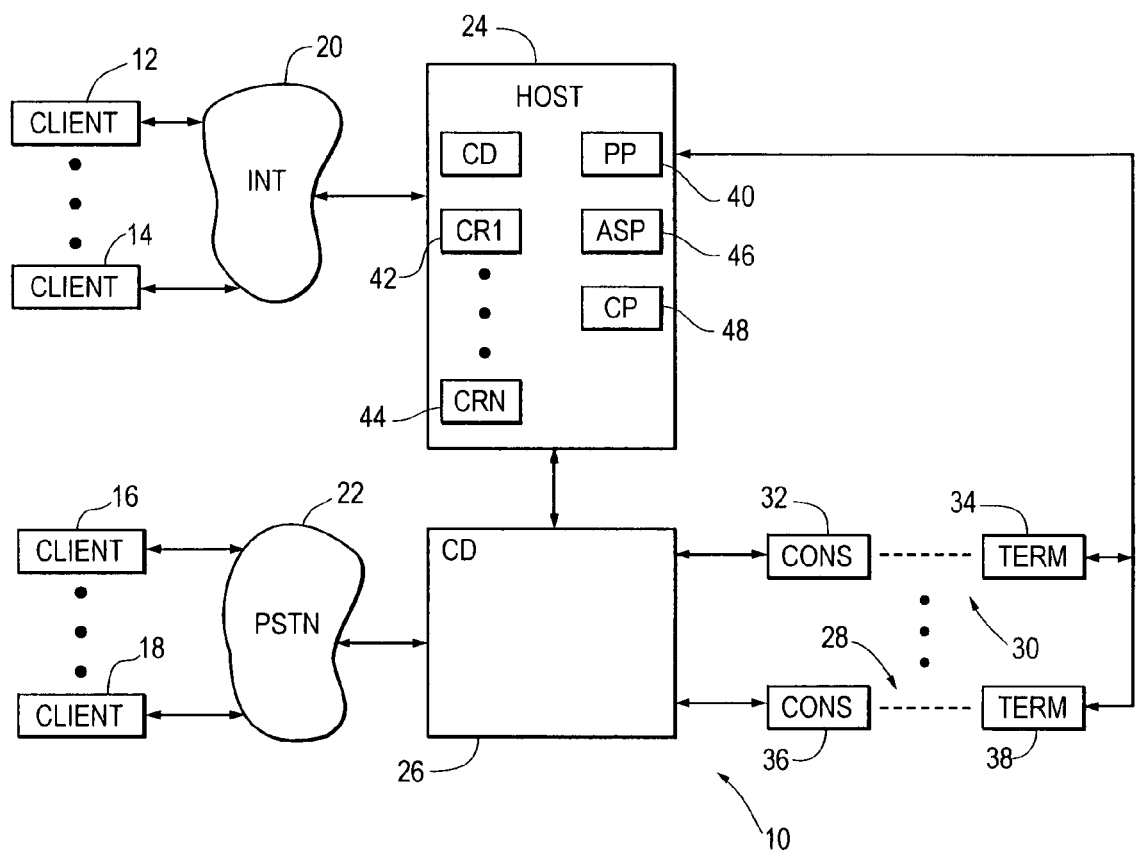
FIG. 1 is a block diagram of a system for distributing calls under an illustrated embodiment of the invention.

FIG. 1 is a block diagram of a contact distribution system 10 shown under an illustrated embodiment of the invention. Under illustrated embodiments, the distribution system 10 may distribute contacts with clients based upon the preferences of the clients and also upon the preferences of the agents.

The contact distribution system 10 may process contacts with clients 12, 14, 16, 18 both through the Internet 20 and through the PSTN 22. In this regard, contacts through the PSTN 22 may be processed by a call distributor 26 while contacts through the Internet 20 may be processed by a host 24

The contact distribution system 10 may include one or more agent stations 28, 30. Each agent station 28, 30 may include a telephone console 32, 36 for accepting contacts with clients 16, 18 through the PSTN 22 and a computer terminal 34, 38 for accepting contacts with clients 12, 14 through the Internet 20.

In general, the system 10 may be used by any of a number of different enterprise organizations (e.g., commercial, environmental, political, etc.) to advance the agenda of the enterprise. Access to the contact system 10 by clients 12, 14, 16, 18 of the organization may be provided through the Internet 20 or PSTN 22 under any of a number of different processes. For example, in order to promulgate the agenda of the organization to its clients 12, 14, the organization may publish contact information (e.g., e-mail addresses, instant message (IM) addresses, universal resource locators (URLs), telephone number, etc.), by advertising or otherwise, that identifies communication ports (i.e., communication system addresses) assigned to the organization.

Alternatively, the organization may purchase communication system identifiers (addresses) of clients 12, 14, 16, 18 from commercial sources. In either case, whether the connection exists through the Internet 20 or PSTN 22, the exchange of information between a client 12, 14, 16, 18 and agent 28, 30 will be referred to herein as a contact.

In order to process contacts with clients, the organization may use the contact distribution system 10 to collect information about the contact for purposes of distributing the contacts to its agents 28, 30. For example, contacts arriving through the PSTN 22 may be delivered with contact associated information such as DNIS and ANI information. Similarly, contacts arriving through the Internet may be delivered under a format where the "from" and "to" fields of any messages may be analyzed to determine source and destination information.

From the contact associated information, a set of agent preferences may be determined for each contact. As used herein, agent preferences refer to agent identification information that would preferably used a client to select an agent to handle the contact. For example, a client 12, 14, 16, 18 who contacts the organization on a particular subject matter would want to converse with the same agent as during a previous contact on that subject matter. Alternatively, the client 12, 14, 16, 18 have a favorite agent and may specifically request that agent 28, 30 when that client contacts the organization.

In other example, the client 12, 14, 16, 18 may require an agent with a specific language capability. In still another example, the client 12, 14, 16, 18 may only care about the skill of an agent 28, 30 in a particular subject matter.

Similarly, the agents 28, 30 may also have contact preferences. Contact preferences of an agent 28, 30 may similarly refer to a favorite client 12, 14, 16, 18. Contact preferences may also include a subject matter of a contact or a geographic region from which the contact originates. Alternatively, a contact preference may be any client 12, 14, 16, 18 with which the agent 28, 30 has had recent contact.

The determination of references may be accomplished using a number of different methods. With regard to agents 28, 30, each agent 28, 30 may be provided with a preferences menu on the agent's terminal 34, 38 through which the agent 28, 30 may select preferences. In addition to selecting preferences, the agent 28, 30 may also order their preferences based upon the desirability of each preference.

Table I is an example of an agent preferences list for agents 1-5. The number shown in the left column are agent identifiers. The numbers 10-14 identify contacts that have been detected and are waiting for an agent assignment.

TABLE I

| AGENT | $1^{ST}$ PREF. | $2^{ND}$ PREF. | $3^{RD}$ PREF. | $4^{TH}$ PREF. | $5^{TH}$ PREF. |
|---|---|---|---|---|---|
| 1 | 14 | 10 | 13 | 11 | 12 |
| 2 | 13 | 14 | 11 | 10 | 12 |
| 3 | 10 | 13 | 11 | 12 | 14 |
| 4 | 12 | 11 | 13 | 10 | 14 |
| 5 | 13 | 11 | 12 | 14 | 10 |

With regard to contact preferences, a preferences processor 40 may determine the preferences of clients from the context of each call and from client records 42, 44, if available. For example, the preferences processor 40 may track the routing of contacts with on-going clients 12, 14, 16, 18 and save the results in the client records 42, 44. If a contact with a client is usually transferred to the same agent, then the preferences processor 40 may identify the agent 28, 30 as a favorite agent 28, 30 of the client 12, 14, 16, 18.

Similarly, if a contact from a client is transferred to an agent with the same skill or skill set, then the preferences processor 40 may determine that the client prefers a particular skill for a particular type of contact. Based upon transfers among agents 28, 30, and the outcome of the contact, the preferences processor 40 may determine a subject matter, a relative skill or even a language capability required by the agent to successfully achieve on objective of the contact (e.g., completion of a sale in a telemarketing context). If the preferences processor 40 should determine that each agent 28, 30 performs equally with a particular client, then the preferences processor 40 may determine that the client's preference is for the most readily (or first) available agent.

The system 10 may use different system addresses for different subject matter. The preferences processor 40 may determine a different agent preference for each system address through which the client contacts the organization. System addresses may also be used for by the preferences processor 40 to determine a preference for each new client.

From the client records 42, 44, the preferences processor 40 may order the agent preferences for each client. For example, a favorite agent may be given the highest relative position in the ordered preferences list of a client. If a favorite agent is not available or cannot be identified, then the preferences processor 40 may determine that a particular agent skill or language should be the next lower preference in the ordered agent preferences list for the client. The lowest preference in the ordered preferences list for a client may, be the first available agent.

From the preferences lists of clients and agents, an agent selection processor 46 may determine a match between clients and agents. In this regard, since the system 10 may use different system addresses for different subject matter, the agent preferences list of a client may be different depending upon the system address through which the client contacts the organization. Because of the agent preferences list may differ based upon the target of the contact initiated by the client, the agent preferences list may more properly be referred to an agent preferences list of the contact (or contact path) rather than of the client.

As each contact is detected by the system 10, a contact processor 48 in the host 24 may open a contact file and save any call associated information in the contact file. The contact processor 48 may also transfer the call associated information from each call to the preferences processor where the preferences processor 40 determines a set of agent preferences for the contact based upon the call associated information.

Shown in Table II is an example of an ordered agent preferences list for contacts 10-15 that may be provided by the preferences processor 40. Contacts 10-15 may be assumed to be set of contacts that were delivered to the system 10 during any particular time period. It may also be assumed that the listing of contacts in Table II is based upon time of arrival with the first listed contact having arrived first and having waiting the longest.

TABLE II

| CONTACT | $1^{ST}$ PREF. | $2^{ND}$ PREF. | $3^{RD}$ PREF. | $4^{TH}$ PREF. | $5^{TH}$ PREF. |
|---|---|---|---|---|---|
| 10 | 2 | 5 | 1 | 3 | 4 |
| 11 | 1 | 2 | 3 | 4 | 5 |
| 12 | 2 | 3 | 5 | 4 | 1 |
| 13 | 1 | 3 | 2 | 4 | 5 |
| 14 | 5 | 3 | 2 | 1 | 4 |

As shown in Table II, the first or highest relative preference in the ordered list of agent preferences for contact 10 is agent 2. It may also be noted from Table II that agent 2 is also the highest preference for contact 12.

Agent selection for assignment to a contact may be either agent based or contact based. Where contact based, agent selection is based primarily upon the ordered lists of agent preferences of the contact and secondarily upon the ordered lists of contact preferences of the agent. Where agent selection is agent based, agent selection is based primarily upon the ordered lists of contact preferences of the agents and secondarily upon the ordered lists of agent preferences of the contacts.

Figure 2:
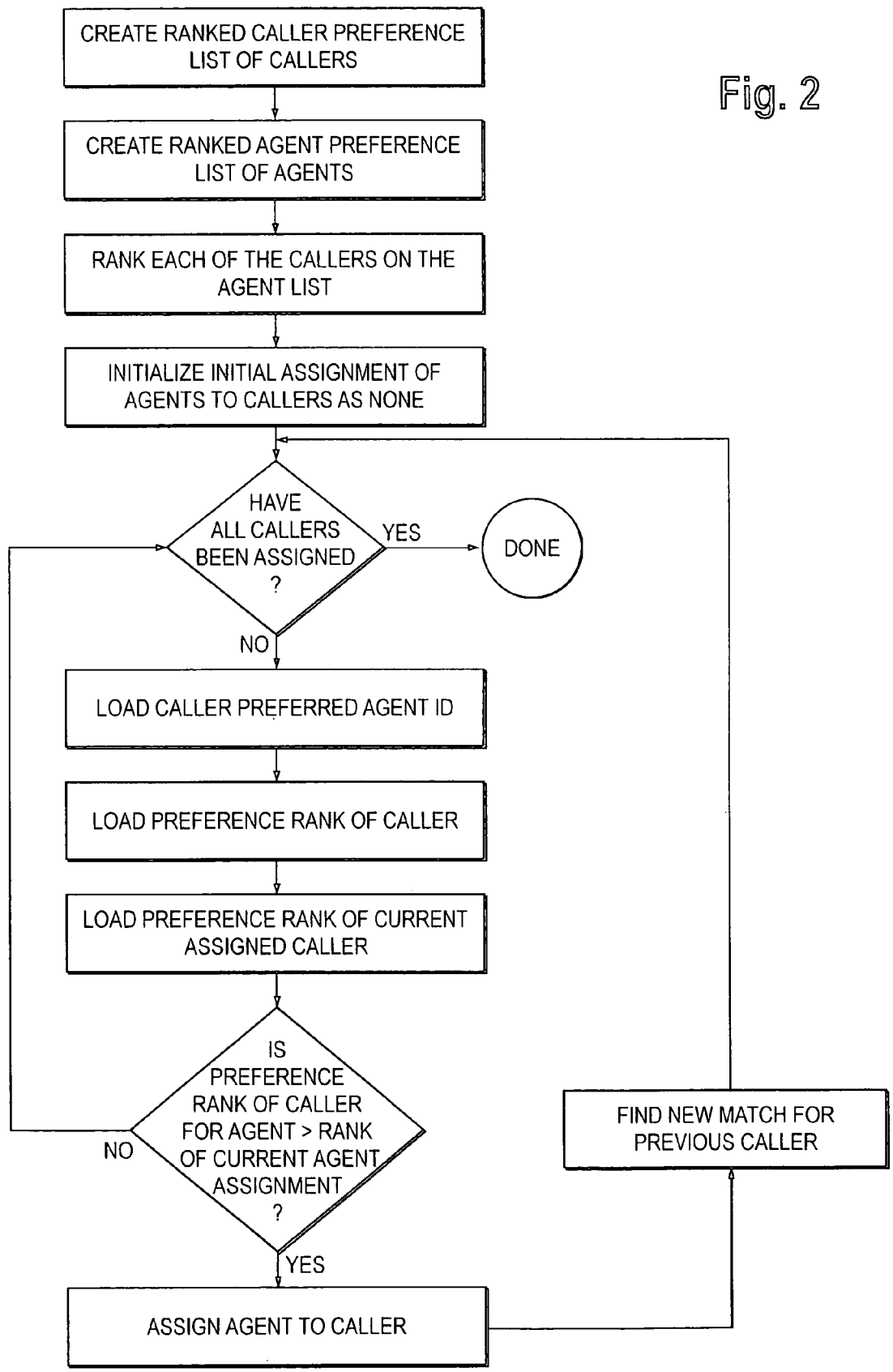
FIG. 2 is a flow chart of method steps that may be used by the system of FIG. 1.

Contact based agent selection may be accomplished under a number of different algorithms operating within the agent selection processor 46. Under a first algorithm (FIG. 2), the selection processor 46 may perform the first step of selecting a first contact from the contact list (e.g., Table II). As a second step, the selection processor may select an agent with a highest relative preference from the ordered list of the first contact. In the case of contact 10 in Table II, the agent with the highest relative preference would be agent 2.

As a third step, the selection processor 46 may then determine whether the selected agent has been previously assigned to another contact of the plurality of contacts. If the selected agent has been previously assigned to another contact, then the processor 46 performs the fourth step of determining whether the other contact has a lower relative preference in the preference list of the selected agent than the first contact. If so, then the fifth step of assigning the selected agent to the first contact is performed. If not, then the sixth step of selecting a next agent in the ordered list of the first contact is performed and the third through sixth steps are repeated. Once an agent is assigned to the first contact, a seventh step of selecting a next contact of the plurality of contacts is performed. Steps two through seven may be repeated until an agent of the plurality of agents has been selected for each contact of the plurality of contacts.

Using Table II as a more direct example, agent 2 is assigned to contact 10 and agent 1 is assigned to contact 11 during a first set of steps. The selection processor 46 may then select contact 12 and determine that agent 2 has already been assigned to contact 10. The selection processor 46 may then refer to the contact preferences list for agent 2 (Table I). Since agent 2 has a higher relative preference for contact 10 than contact 12, the processor 46 selects the next agent (agent 3). Since agent 3 has not been previously assigned, the selection processor assigns agent 3 to contact 12.

During a next set of steps, the selection processor selects contact 13. Since agent 1 has been previously assigned to contact 11, the processor 46 may then refer to the contact preferences list for agent 1 (Table I) and determine that contact 13 has a higher preference than contact 11. As such, the selection processor 46 revokes (de-assigns) the assignment of agent 1 to contact 11 and, instead, assigns agent 1 to contact 13.

The process described above may be repeated until each contact has an agent assigned to the contact. In the example offered above based upon Tables I and II, ten iterations are required to assign an agent to each contact. Following the ten iterations, agent 1 is assigned to contact 10, agent 4 is assigned to contact 11, agent 5 is assigned to contact 12, agent 3 is assigned to contact 13 and agent 2 is assigned to contact 15.

Where agent selection is agent based, the process may occur on a similar basis. In this case, the selection processor 46 may perform the first step of selecting a first agent from the agent list (e.g., Table I). As a second step, the selection processor may select a contact with a highest relative preference from the ordered list of the first agent. In the case of agent 1 in Table I, the contact with the highest relative preference would be contact 14.

As a third step, the selection processor 46 may then determine whether the selected contact has been previously assigned to another agent of the plurality of agents. If the selected contact has been previously assigned to another agent, then the processor 46 performs the fourth step of determining whether the other agent has a lower relative preference in the preference list of the selected contact than the first agent. If so, then the fifth step of assigning the selected contact to the first agent is performed. If not, then the sixth step of selecting a next contact in the ordered list of the first agent is performed and the third through sixth steps are repeated. Once a contact is assigned to the first agent, a seventh step of selecting a next agent of the plurality of agents is performed. Steps two through seven may be repeated until a contact has been selected for each available agent or the number of contacts is exhausted.

Using the above process and apparatus, agents may be selected for contacts based upon the preferences of both client and agent. Assignment of agents to contacts based upon the preferences of both client and agent is a significant improvement over prior methods because it empowers the agent in a way that reduces stress and job burnout and improves overall agent performance.

A specific embodiment of method and apparatus for assigning agents to contacts has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of assigning a plurality of live agents to a plurality of contacts that have been detected and are awaiting assignment within a contact distribution system, such method comprising:
   providing within the contact distribution system an ordered list of agent preferences for each respective contact of the plurality of contacts, the ordered list for each respective contact, including a preference ranking of each agent relative to each other agent representing a preference of the respective contact for being handled by each agent;
   providing within the contact distribution system an ordered list of contact preferences for each respective agent of the plurality of agents, the ordered list of contact preferences for each respective agent selected by the respective agent and including a preference ranking of each contact relative to each other contact representing a preference of the respective agent to handle the contact; and
   assigning an agent of the plurality of agents to a contact of the plurality of contacts based upon the preferences lists of both the contact and agent.

2. The method of assigning as in claim 1 further comprising assigning agents based primarily upon contact preferences and secondarily upon agent preferences.

3. The method of assigning as in claim 2 further comprising selecting a selected contact from the plurality of contacts.

4. The method of assigning as in claim 3 further comprising selecting an agent with a highest relative preference from the ordered list of the selected contact.

5. The method of assigning as in claim 4 further comprising determining whether the selected agent has been previously assigned to another contact of the plurality of contacts.

6. The method of assigning as in claim 5 further comprising if the selected agent has been previously assigned to another contact, then determining whether the other contact has a lower relative preference in the preference list of the selected agent than the selected contact and if so, then assigning the selected agent to the selected contact.

7. The method of assigning as in claim 6 further comprising if the other contact doesn't have a lower relative preference in the preference list of the selected agent, then selecting a next agent in the ordered list of the first contact and determining whether the selected next agent has been previously assigned to another contact of the plurality of contacts.

8. The method of assigning as in claim 7 further comprising repeatedly selecting a next contact of the plurality of contacts and assigning an agent to the next contact based upon the ordered lists until an agent of the plurality of agents has been selected for each contact of the plurality of contacts.

9. The method of assigning as in claim 1 further comprising assigning agents based primarily upon agent preferences and secondarily upon contact preferences.

10. The method of assigning as in claim 9 further comprising the contact distribution system selecting a selected agent from the plurality of agents.

11. The method of assigning as in claim 10 further comprising selecting a contact with a highest relative preference from the ordered list of the selected agent.

12. The method of assigning as in claim 11 further comprising determining whether the selected contact has been previously assigned to another agent of the plurality of agents.

13. The method of assigning as in claim 12 further comprising if the selected contact has been previously assigned to another agent, then determining whether the other agent has a lower relative preference in the preference list of the selected contact than the selected agent and if so, then assigning the selected contact to the selected agent.

14. The method of assigning as in claim 13 further comprising if the other agent doesn't have a lower relative preference in the preference list of the selected contact, then selecting a next contact in the ordered list of the selected agent and determining whether the selected next contact has been previously assigned to another agent of the plurality of agents.

15. The method of assigning as in claim 14 further comprising selecting a next agent of the plurality of agents repeatedly selecting a contact of the plurality of contacts having a highest relative preference from the order list of the selected next agent, determining whether the selected contact has been previously assigned to another agent if the plurality of agents and assigning a contact to an agent based on the ordered lists until a contact of the plurality of contacts has been selected for each agent of the plurality of agents.

16. A method of assigning a plurality of agents to a plurality of contacts that have been detected and are waiting assignment within a contact system distribution, such method comprising:
   a) providing an ordered list of agent preferences for each respective contact of the plurality of contacts, the ordered list for each respective contact including a preference ranking of each agent relative to each other agent representing a preference of the respective contact to be handled by each agent;
   b) providing an ordered list of contact preferences for each respective agent of the plurality of agents, the ordered list of contact preferences for each respective agent selected by the respective agent and including a preference ranking of each contact relative to each other contact representing a preference for handling the contact by the respective agent;
   c) selecting a selected contact from the plurality of contacts;
   d) selecting an agent with a highest relative preference from the ordered list of the selected contact;
   e) determining whether the selected agent has been previously assigned to another contact of the plurality of contacts;
   f) if the selected agent has been previously assigned to another contact, then determining whether the other contact has a lower relative preference in the preference list of the selected agent than the selected contact; and
   g) if so, then assigning the selected agent to the selected contact;
   h) if not, then selecting a next agent in the ordered list of the selected contact and repeating steps e-h substituting the selected next agent as the selected agent; and
   i) selecting a next contact of the plurality of contacts and repeating steps d-i substituting the selected next contact as the selected contact until an agent of the plurality of agents has been selected for each contact of the plurality of contacts.

17. The method of assigning a plurality of agents to a plurality of contacts as in claim 16 wherein an agent with a highest relative preference in the ordered list of agent preferences for a contact of the plurality of contacts further comprises an agent of the plurality of agents with which the contact has had most recent communication.

18. The method of assigning a plurality of agents to a plurality of contacts as in claim 16 wherein an agent preference of the agent preferences further comprises a relative skill of an agent of the plurality of agents in a subject matter of interest to a contact of the plurality of contacts.

19. The method of assigning a plurality of agents to a plurality of contacts as in claim 16 wherein an agent preference of the agent preferences further comprises a most readily available agent of the plurality of agents.

20. The method of assigning a plurality of agents to a plurality of contacts as in claim 16 wherein an agent preference of the agent preferences further comprises a favorite agent of the plurality of agents.

21. The method of assigning a plurality of agents to a plurality of contacts as in claim 16 wherein an agent preference of the agent preferences further comprises a language capability of an agent of the plurality of agents.

22. The method of assigning a plurality of agents to a plurality of contacts as in claim 16 wherein a contact preference of the contact preferences of an agent further comprises a favorite contact of the plurality of contacts.

23. The method of assigning a plurality of agents to a plurality of contacts as in claim 16 wherein a contact preference of the contact preferences of an agent further comprises a contact of the plurality of contacts with which the agent of the plurality of agents has had most recent communication.

24. The method of assigning a plurality of agents to a plurality of contacts as in claim 16 wherein a contact preference of the contact preferences of an agent further comprises a subject matter of a contact of the plurality of contacts.

25. The method of assigning a plurality of agents to a plurality of contacts as in claim 16 wherein a contact preference of the contact preferences of an agent further comprises a geographic region of a contact of the plurality of contacts.

26. An apparatus for assigning a plurality of agents to a plurality of contacts awaiting assignment within the apparatus, such apparatus comprising:
   means for providing an ordered list of agent preferences for each respective contact of the plurality of contacts, the ordered list for each respective contact, including a preference ranking of each agent relative to each other agent as a preferred handling priority of the respective contact;
   means for providing an ordered list of contact preferences for each respective agent of the plurality of agents, the ordered list of contact preferences for each respective agent selected by the respective agent and including a ranking of each contact relative to each other contact as a preferred priority for the respective agent to handle the contact;
   means for assigning an agent of the plurality of agents to a contact of the plurality of contacts based upon the preferences lists of both the contact and agent.

27. The apparatus for assigning as in claim 26 further comprising means for assigning agents based primarily upon contact preferences and secondarily upon agent preferences.

28. The apparatus for assigning as in claim 27 further comprising means for selecting a selected contact from the plurality of contacts.

29. The apparatus for assigning as in claim 28 further comprising means for selecting an agent with a highest relative preference from the ordered list of the selected contact.

30. The apparatus for assigning as in claim 29 further comprising means for determining whether the selected agent has been previously assigned to another contact of the plurality of contacts.

31. The apparatus for assigning as in claim 30 further comprising means for determining whether the selected agent has been previously assigned to another contact and, if so, then determining whether the other contact has a lower relative preference in the preference list of the selected agent than the selected contact and if so, then assigning the selected agent to the selected contact.

32. The apparatus for assigning as in claim 31 further comprising means for determining whether the other contact doesn't have a lower relative preference in the preference list of the selected agent and, if so, then selecting a next agent in the ordered list of the first contact.

33. The apparatus for assigning as in claim 32 further comprising means for selecting a next contact of the plurality of contacts.

34. An apparatus for assigning a plurality of agents to a plurality of contacts awaiting assignment to an agent within the apparatus, such apparatus comprising:

an ordered list of agent preferences provided for each respective contact of the plurality of contacts, the ordered list for each respective contact, including a preference ranking of each agent relative to each other agent representing a preference of the respective contact for being handled by each agent;

an ordered list of contact preferences provided for each respective agent of the plurality of agents, the ordered list of contact preferences for each respective agent selected by the respective agent and including a ranking of each contact relative to each other contact representing a preference for the respective agent to handle the contact; and an agent selection processor that assigns an agent of the plurality of agents to a contact of the plurality of contacts based upon the preferences lists of both the contact and agent.

* * * * *